(12) United States Patent
Nemeth

(10) Patent No.: US 10,869,471 B2
(45) Date of Patent: Dec. 22, 2020

(54) CRYOGENIC STORAGE AND FREEZING BEAKER

(71) Applicant: Lee L. Nemeth, Prospect, CT (US)

(72) Inventor: Lee L. Nemeth, Prospect, CT (US)

(\*) Notice: Subject to any disclaimer, the term of this patent is extended or adjusted under 35 U.S.C. 154(b) by 0 days.

(21) Appl. No.: 16/707,711

(22) Filed: Dec. 9, 2019

(65) Prior Publication Data

US 2020/0187492 A1    Jun. 18, 2020

Related U.S. Application Data

(63) Continuation of application No. 16/705,765, filed on Dec. 6, 2019.

(60) Provisional application No. 62/780,090, filed on Dec. 14, 2018, provisional application No. 62/780,090, filed on Dec. 14, 2018.

(51) Int. Cl.
| | |
|---|---|
| *A01N 1/02* | (2006.01) |
| *B01L 7/00* | (2006.01) |
| *B01L 3/00* | (2006.01) |
| *F25D 3/10* | (2006.01) |

(52) U.S. Cl.
CPC .......... *A01N 1/0257* (2013.01); *B01L 3/5082* (2013.01); *B01L 7/50* (2013.01); *F25D 3/107* (2013.01); *B01L 2200/16* (2013.01); *B01L 2200/18* (2013.01); *B01L 2300/021* (2013.01); *B01L 2300/041* (2013.01); *B01L 2300/047* (2013.01); *B01L 2300/06* (2013.01); *B01L 2300/0832* (2013.01); *B01L 2300/0848* (2013.01)

(58) Field of Classification Search
CPC .................................................. A01N 1/0257
USPC ....................................................... 435/284.1
See application file for complete search history.

(56) References Cited

U.S. PATENT DOCUMENTS

| | | | | |
|---|---|---|---|---|
| 4,883,452 | A | * | 11/1989 | Kasai .................. A01N 1/02 600/36 |
| 2006/0010881 | A1 | | 1/2006 | Gustafson |
| 2009/0202978 | A1 | * | 8/2009 | Shaham .................. A01N 1/02 435/1.3 |
| 2010/0043572 | A1 | * | 2/2010 | Himmelsbach .......... B01L 9/06 73/863.11 |
| 2010/0127148 | A1 | | 5/2010 | Woidtke et al. |
| 2013/0014526 | A1 | | 1/2013 | Cassidy et al. |
| 2014/0130520 | A1 | | 5/2014 | Snow et al. |

(Continued)

FOREIGN PATENT DOCUMENTS

WO    2018115833 A1    6/2018

OTHER PUBLICATIONS

International Search Report and Written Opinion of the International Searching Authority, PCT/US19/64928 (dated Feb. 14, 2020).

*Primary Examiner* — Holly Kipouros
(74) *Attorney, Agent, or Firm* — Ware, Fressola, Maguire & Barber LLP

(57) ABSTRACT

The present invention is directed to providing a cryogenic storage device and system that can be regulated at a constant temperature for cryopreservation of biological materials. A cryogenic storage system for cryopreservation of biological materials is provided that may include a storage beaker having at least one storage chamber formed therein, a cooling source, and a cold finger that may be configured to thermally couple the storage beaker to the cooling source.

12 Claims, 23 Drawing Sheets

(56) References Cited

U.S. PATENT DOCUMENTS

2014/0157798 A1* 6/2014 Jimenez-Rios ...... A01N 1/0257
62/62
2015/0011000 A1 1/2015 Stojanov
2015/0204598 A1 7/2015 Affleck et al.
2018/0292051 A1 10/2018 Ally

* cited by examiner

CRYOGENIC STORAGE AND FREEZING BEAKER

CROSS-REFERENCE TO RELATED APPLICATIONS

The present application is a continuation of U.S. application Ser. No. 16/705,765 filed Dec. 6, 2019, which claimed priority to U.S. Provisional Appl. No. 62/780,090 filed Dec. 14, 2018, and the present application claims priority to U.S. Provisional Appl. No. 62/780,090 filed Dec. 14, 2018, all of which are hereby incorporated by reference in their entireties.

BACKGROUND OF THE INVENTION

1. Field of the Invention

The present invention is directed to cryogenic storage devices and systems for cryopreservation, and more particularly to a cryogenic storage and freezing beaker for cryopreservation of biological materials.

2. Description of Related Art

Cryopreservation involves the process of cooling biological materials, such as organelles, cell, tissues, embryos, extracellular matrix and/or organs, to very low temperatures, for example 77 Kelvin (−196° C.) using liquid nitrogen or 193 Kelvin (−80° C.) using dry ice (solid carbon dioxide). At such low temperatures, any biological and/or chemical activity that may cause damage to the biological material is effectively halted, thereby preserving the biological material. However, for the purposes of cryopreservation it is necessary to reach low temperatures without causing damage to the biological materials through the formation of ice crystals. This may be accomplished through the use of cryoprotectants and/or rapid cooling of the biological materials to the desired cryopreservation temperature.

One of the main purposes of cryopreservation is to allow for long term storage of biological materials. Such long term storage may include the storage of human or other animal egg cells or embryos for fertilization or implantation at a later time. Currently, the primary means of cryopreservation for human or other animal egg cell and/or embryos involves cryopreservation using liquid nitrogen, and storage in dewars containing liquid nitrogen. However, there are several drawbacks to the current methods and systems. Since liquid nitrogen is constantly evaporating, additional liquid nitrogen must be continuously added to ensure that the storage vessels are maintained at the appropriate temperatures to allow for long term storage. Fluctuations in temperature during storage can result in the biological materials reaching inappropriate temperatures, and/or undergoing inappropriate thawing and re-freezing cycles. A significant amount of effort must be spent monitoring the temperatures of the storage vessels and adding additional liquid nitrogen as needed. Furthermore, often biological materials from multiple sources are stored within the same storage vessel. This can result in potential confusion and mix-ups if the biological material are inaccurately labeled or if inattentive personnel fail to follow proper protocols.

Therefore, there is a need for cryopreservation techniques and systems that provide for stable cryopreservation and storage, and reduce the likelihood of any confusion regarding the origins of any cryopreserved biological material.

SUMMARY OF THE INVENTION

The present invention is designed to overcome the above noted limitations that are attendant upon the use of conventional cryopreservation techniques and systems and, toward this end, it contemplates the provision of a novel cryogenic storage and freezing beaker.

Accordingly, it is an object of the present invention to provide a cryogenic storage device and system that can be regulated at a constant temperature for cryopreservation of biological materials.

It is another object of the present invention to provide a cryogenic storage device and system that can be regulated at temperatures lower than currently available through the use of conventional cryopreservation cooling techniques.

It is yet another object of the present invention to provide a cryogenic storage device and system that provides for individual storage of biological materials from the same origin, in order to reduce and/or eliminate the chance of confusing regarding the origin of biological materials.

It is still another object of the present invention to provide a portable cryogenic storage device and system that is configured for transport.

It is another object of the present invention to provide a portable cryogenic storage device and system that is configured for transport between a cryopreservation work station to a cryopreservation storage area.

It is yet another object of the present invention to provide a cryogenic storage cabinet for cryogenic storage of multiple cryogenic storage devices.

It is still another object of the present invention to provide a cryogenic storage device that includes electronic identification, tracking and/or verification components.

It is another object of the present invention to provide a cryogenic freezing beaker for use in vitrification of biological materials.

In accordance with an exemplary embodiment of the present invention, a cryogenic storage system for cryopreservation of biological materials is provided that may include a storage beaker having at least one storage chamber formed therein, a cooling source, and a cold finger that may be configured to thermally couple the storage beaker to the cooling source.

In accordance with this and other exemplary aspects of the present invention, the storage beaker may include an opening configured for receipt of the cold finger.

In accordance with this and other exemplary aspects of the present invention, the storage beaker may include a double-walled pod having a vacuum area disposed within the double-walled pod.

In accordance with this and other exemplary aspects of the present invention, the storage beaker may also include an opening configured for receipt of the cold finger at least partially surrounded by the vacuum area.

In accordance with this and other exemplary aspects of the present invention, the at least one storage chamber may be positioned between the opening configured for receipt of the cold finger and the vacuum area disposed within the double-walled pod.

In accordance with this and other exemplary aspects of the present invention, the cooling source may be a mechanical cooler configured to maintain the temperature of the cold finger to between 14 to 55 Kelvin.

In accordance with this and other exemplary aspects of the present invention, the cooling source may be liquid nitrogen configured to reduce the temperature of the cold finger to between 14 to 77 Kelvin.

In accordance with this and other exemplary aspects of the present invention, the mechanical cooler may be configured to maintain the temperature of the cold finger at a constant temperature between 14 to 55 Kelvin.

In accordance with this and other exemplary aspects of the present invention, each of the at least one storage chamber may be configured for retention of at least one vitrification stick.

In accordance with this and other exemplary aspects of the present invention, the storage beaker may include at least a first storage chamber and a second storage chamber, and the storage beaker may be labeled with an indicia, and the first storage chamber may be labeled with a first marking and the second storage chamber may be labeled with a second marking.

In accordance with this and other exemplary aspects of the present invention, the storage beaker may include at least one electronic tracking component.

In accordance with this and other exemplary aspects of the present invention, the storage beaker may also include a reservoir for holding of a cooling agent.

In accordance with this and other exemplary aspects of the present invention, the reservoir may be connected to the at least one storage chamber through a threaded hole.

In accordance with this and other exemplary aspects of the present invention, the cooling agent may be liquid nitrogen or dry ice.

In accordance with this and other exemplary aspects of the present invention, the cryogenic storage system may be portable.

In accordance with this and other exemplary aspects of the present invention, the cryogenic storage system may also include a second cold finger thermally coupled to the cooling source, and a freezing beaker thermally coupled to the second cold finger, the freezing beaker may be positioned substantially adjacent to the storage beaker so as to form a cryogenic work station.

In accordance with this and other exemplary aspects of the present invention, the freezing beaker may include a vitrification plate thermally coupled to the second cold finger.

In accordance with this and other exemplary aspects of the present invention, the cryogenic storage system may also include a second cold finger thermally coupled to the cooling source, and a second storage beaker thermally coupled to the cooling source by the second cold finger, wherein the first storage beaker and the second storage beaker are disposed within a storage tray.

In accordance with this and other exemplary aspects of the present invention, the storage beaker may include an insulating lid.

In accordance with this and other exemplary aspects of the present invention, the storage beaker may be at least partially enclosed within a housing.

BRIEF DESCRIPTION OF THE DRAWINGS

For a fuller understanding of the nature and objects of the present invention, reference is made to the following detailed description taken in connection with the accompanying drawings in which.

DETAILED DESCRIPTION

Figure 1A:
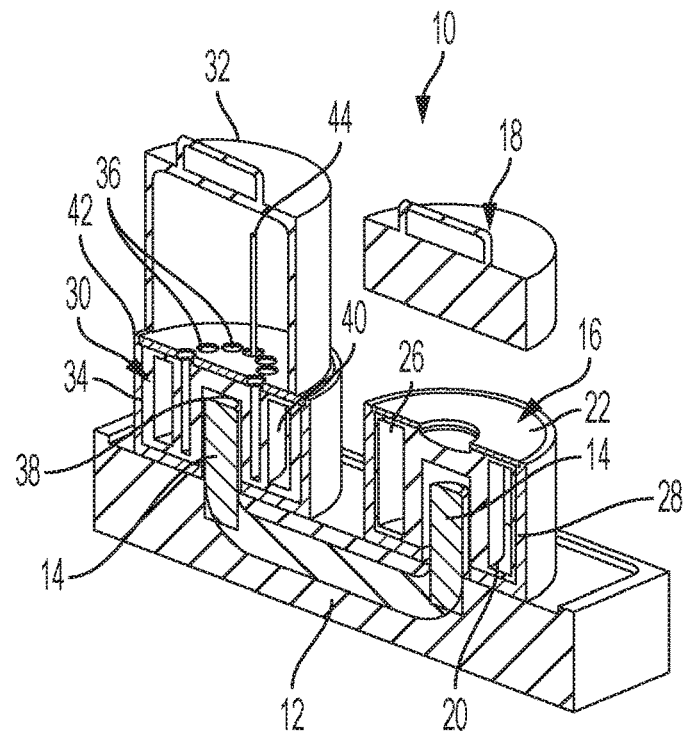
FIG. 1A is a cross-sectional view of an exemplary cryogenic work station that includes a freezing beaker and a storage beaker connected to a freezing source.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIG. 1A, therein illustrated is a work station, generally indicated by reference number 10, for use in the cryopreservation of biological materials. The work station 10 may include a cooling source 12 that is configured to provide cooling to at least one cold finger 14 extending from the cooling source 12 to the work station 10. The cooling source 12 may be a mechanical cooling device, for example an electrically refrigerated cryostat, such as a Cryo-Pulse 5 Plus available from Mirion Technologies, or may be a low temperature liquid, such as liquid nitrogen, or a low temperature solid, such as dry ice. The mechanical cooling device may be configured to reduce the temperature of the cold finger 14 to 55 Kelvin (−218° C.), while the liquid nitrogen may only be able to reduce the temperature of the cold finger 14 to 77 Kelvin (−196° C.), and therefore it is understood that there are advantages attendant upon the use of a mechanical cooling device as the cooling source 12. The mechanical cooling device is configured to maintain the cold finger at a constant temperature. The work station 10 may further include a freezing beaker 16 that provides a platform on which the cryopreservation of biological materials may be conducted.

Figure 2:
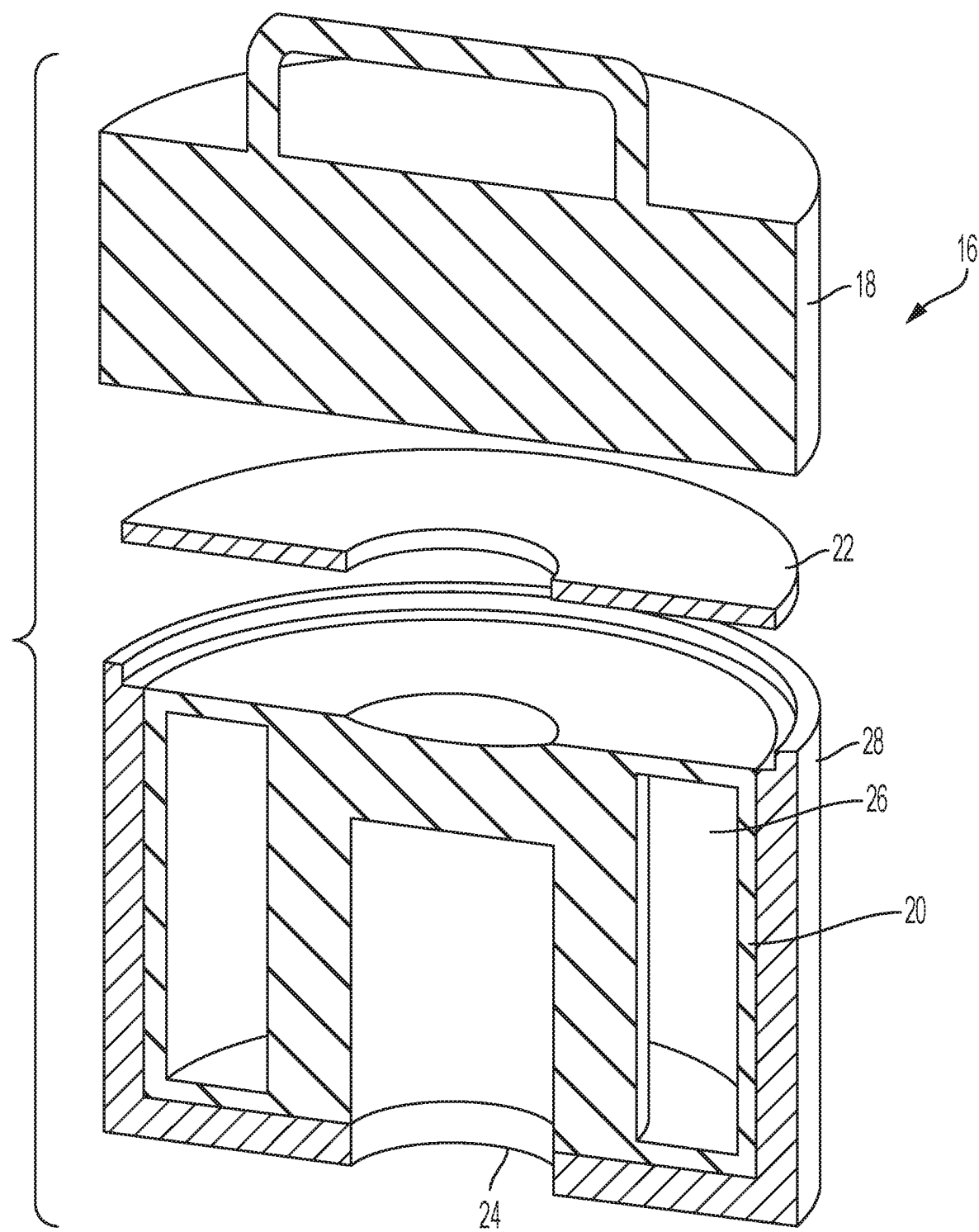
FIG. 2 is an exploded cross-sectional view of an exemplary cryogenic freezing beaker.
Figure 3:
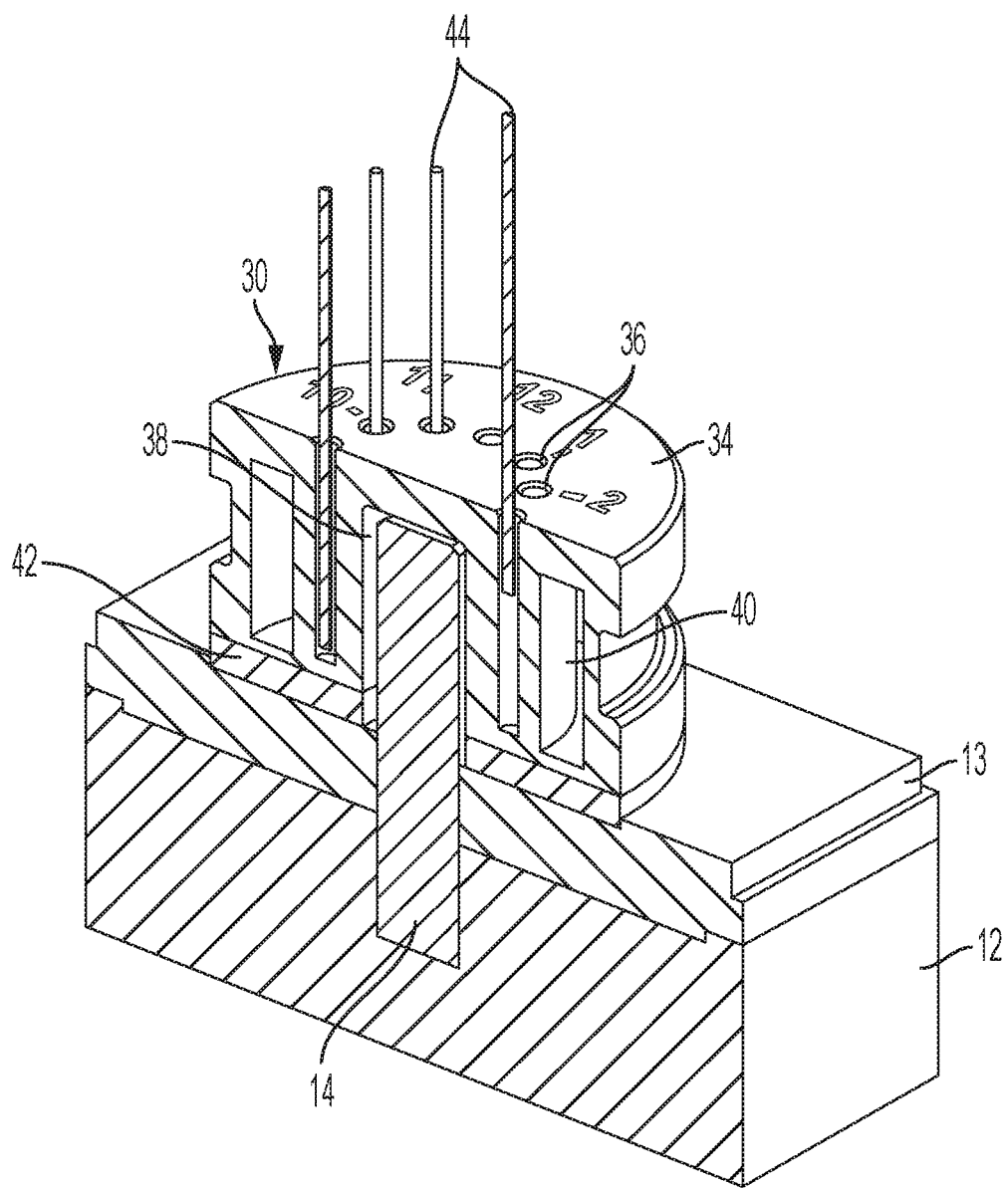
FIG. 3 is a cross-sectional view of an exemplary cryogenic storage system including an exemplary cryogenic storage beaker taken along line 3-3 in FIG. 9.
Figure 4:
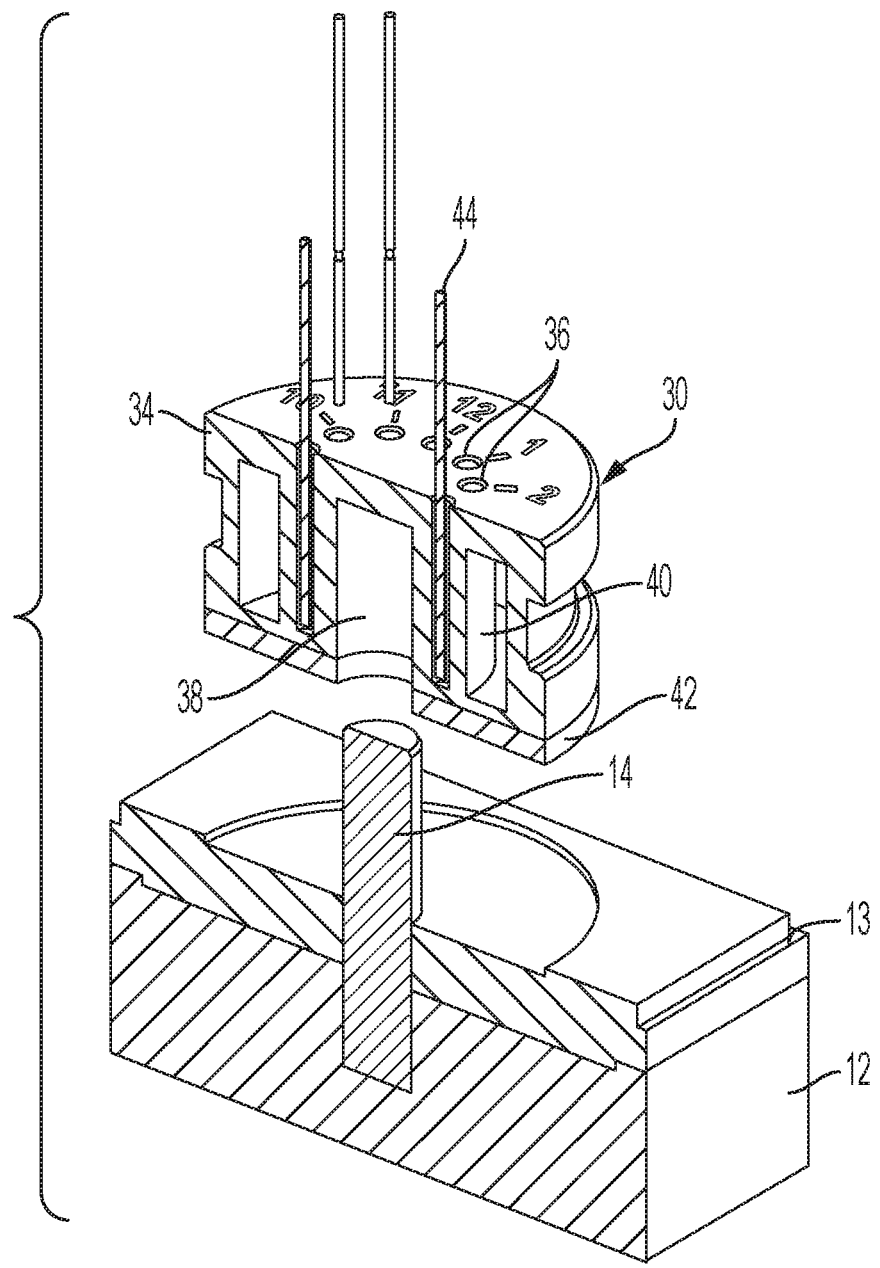
FIG. 4 is an exploded cross-sectional view of the exemplary cryogenic storage system from FIG. 3.
Figure 5:
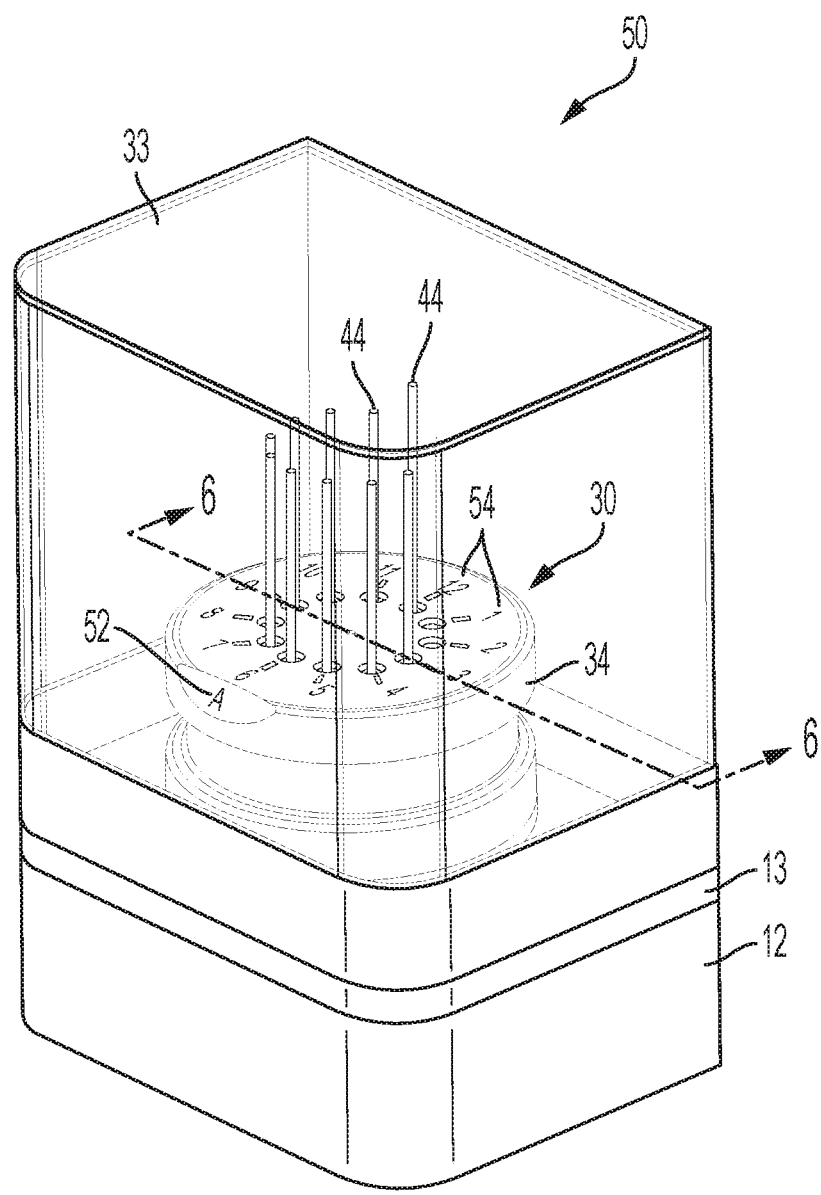
FIG. 5 is an isometric view of an exemplary cryogenic storage system including an exemplary cryogenic storage beaker.
Figure 6:
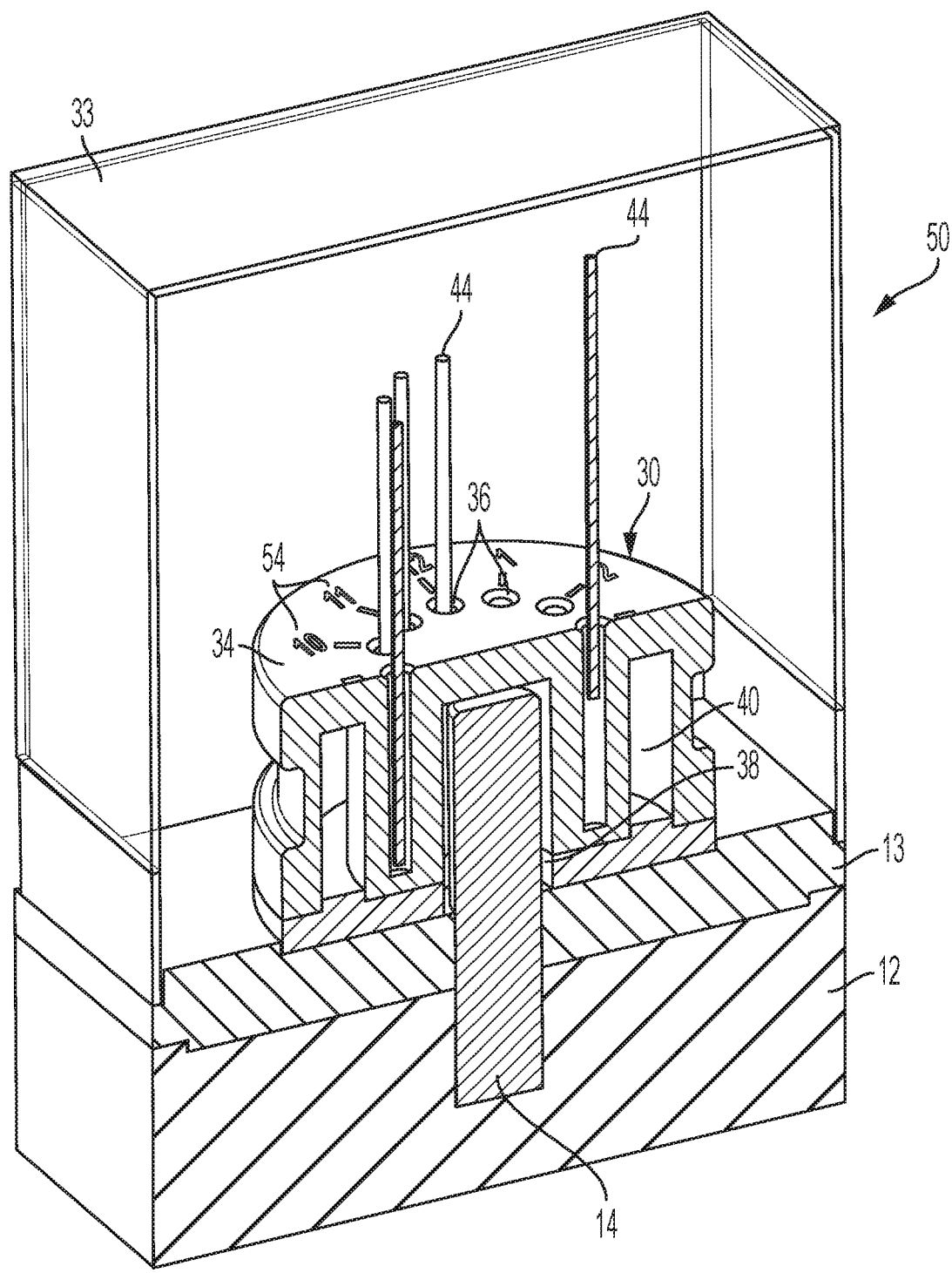
FIG. 6 is a cross-sectional view of the exemplary cryogenic storage system taken along line 6-6 from FIG. 5.
Figure 7:
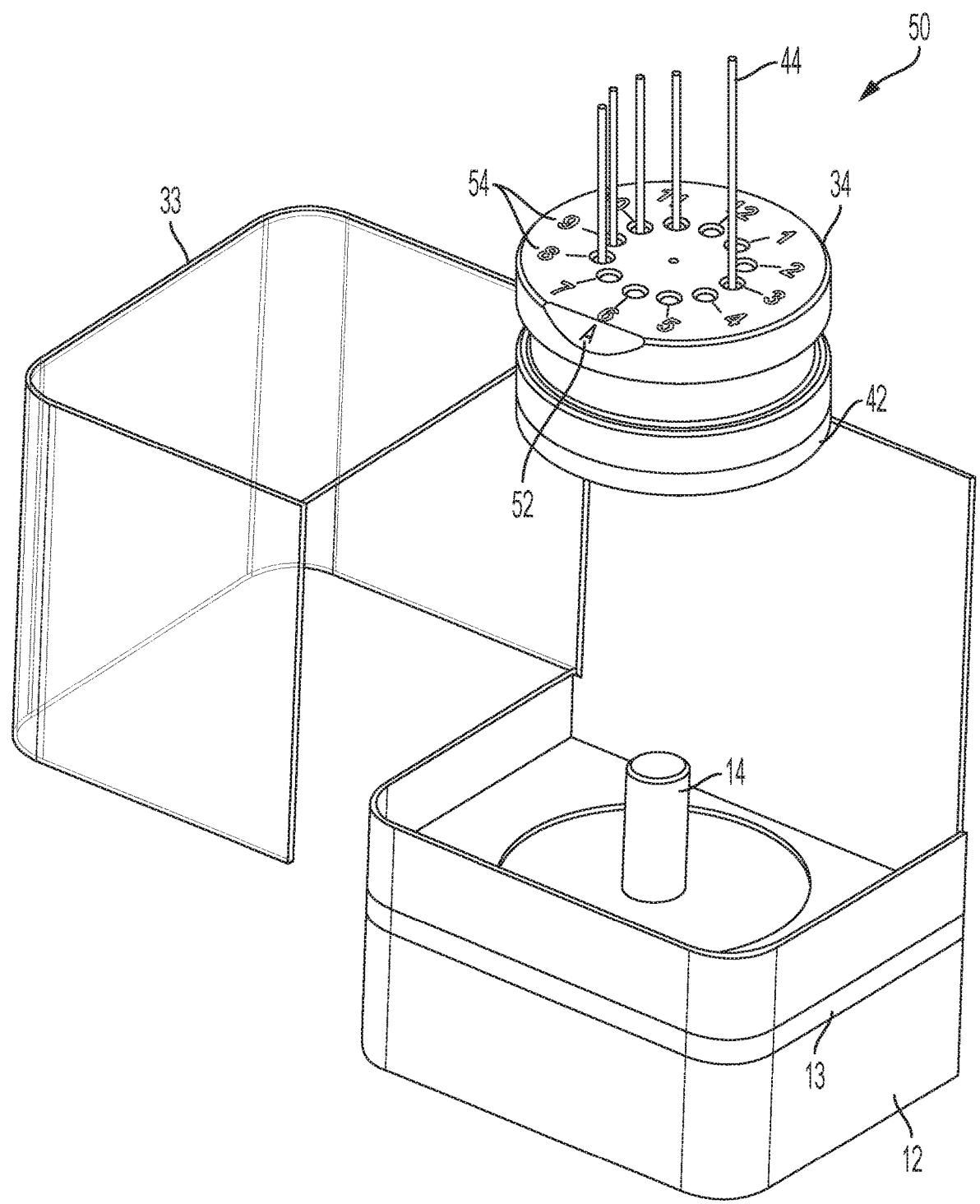
FIG. 7 is an exploded view of the exemplary cryogenic storage system from FIG. 5.

Referring now to FIGS. 1A and 2, the freezing beaker 16 may include an insulating lid 18 that facilitates in maintaining the desired temperature of the freezing beaker 16. The freezing beaker 16 may also include a double-walled pod 20 that includes a vitrification plate 22, on which cryopreservation of biological materials, such as human or other animal eggs and/or embryos may be vitrified, and an opening 24 configured for receipt of the cold finger 14. The vitrification plate 22 may made from a thermally conductive material, such as cooper, and may be chrome plated in order to provide to ease of cleaning. The cold finger 14, which may be made from a thermally conductive material, such as cooper, may be dimensioned to fit snuggly within the opening 24 so that cooling from the cooling source 12 is transferred to the freezing beaker 16 and the vitrification plate 22. In order to reduce the amount of heat gain the double-walled pod 20 may include a vacuum area 26 between the walls and additional insulation 28 at least partially surrounding the double-walled pod 20.

Figure 1B:
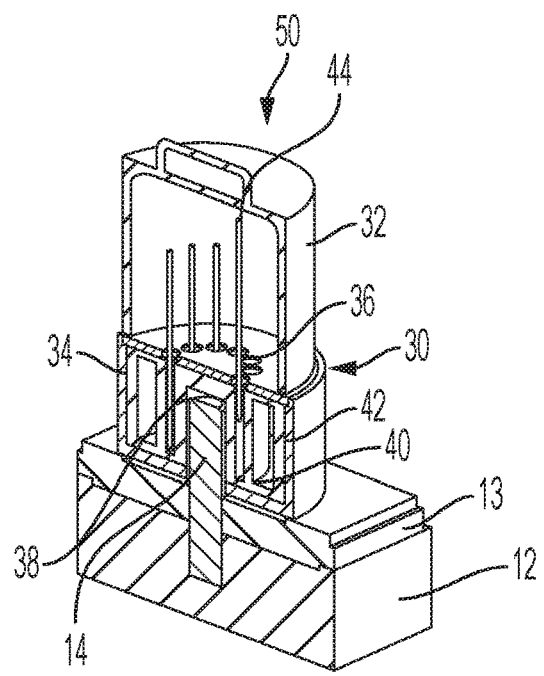
FIG. 1B is a cross-sectional view of an exemplary cryogenic storage system.
Figure 8:
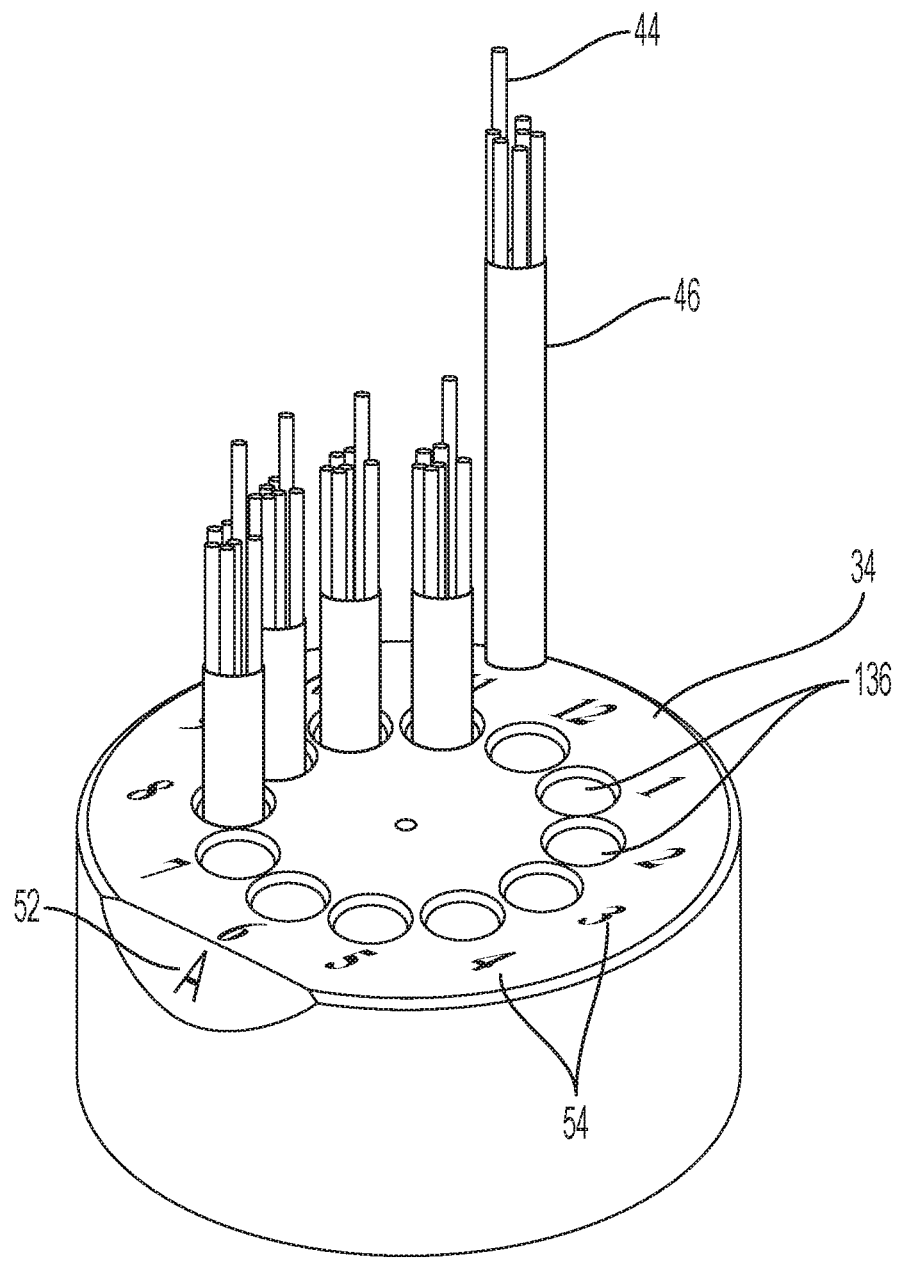
FIG. 8 is an isometric view of an exemplary cryogenic storage beaker for use in connection with the exemplary cryogenic storage system according to various aspects of the present invention.
Figure 9:
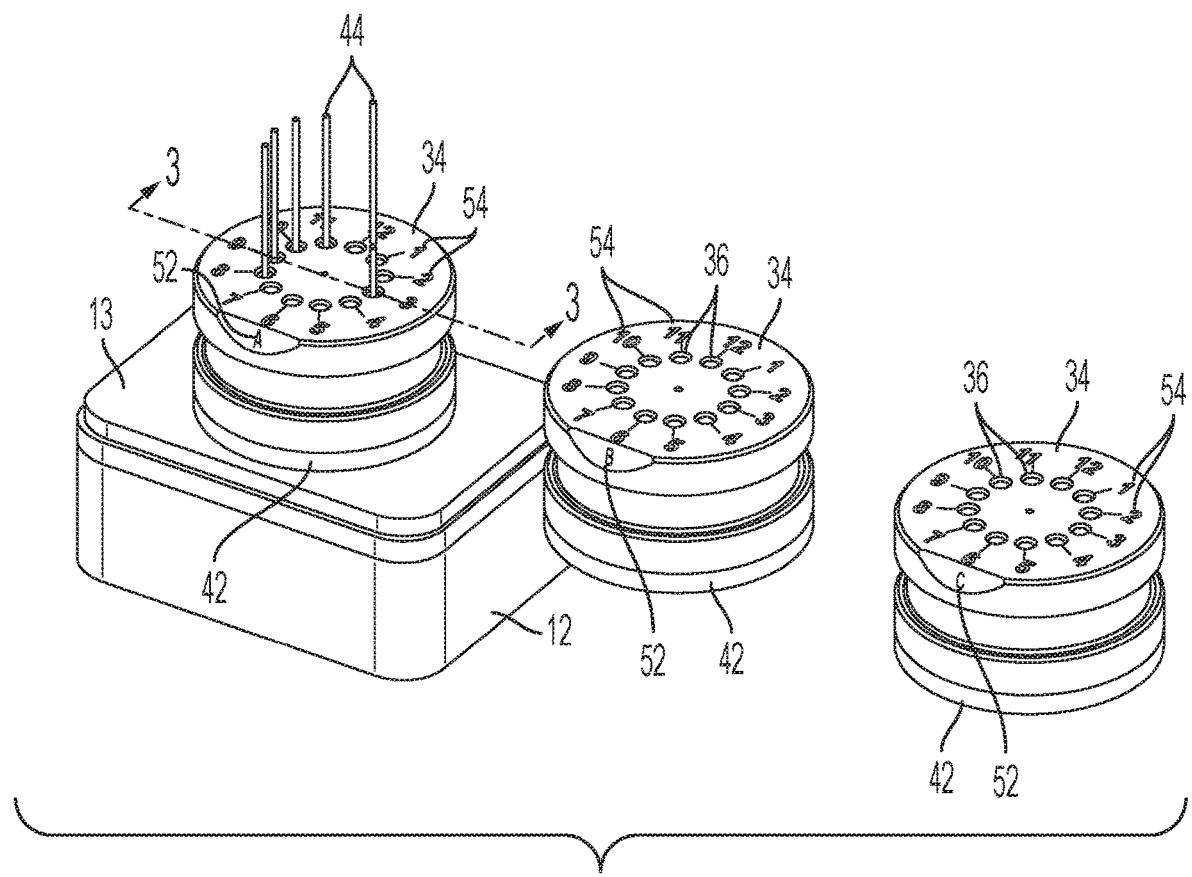
FIG. 9 is an isometric view of exemplary cryogenic storage beakers.
Figure 10:
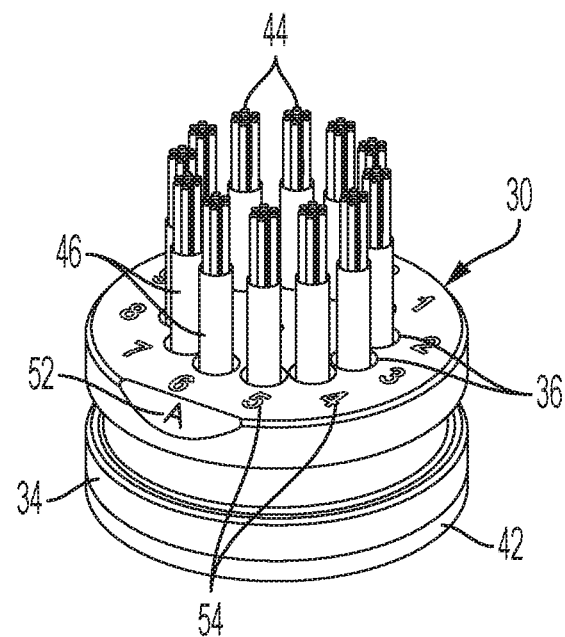
FIG. 10 is an isometric view of an exemplary cryogenic storage beaker according to various aspects of the present invention.

Referring again the FIG. 1A, the work station 10 may also include a storage beaker 30 configured to receive the biological materials that have been cryogenically frozen using the freezing beaker 16. The positioning of the storage beaker 30, which may ultimately be used for long term cryogenic storage of the biological materials relative to the freezing beaker 16 on the work station 10 allows for maintenance of the cryogenic temperature of the cryopreserved biological materials. The storage beaker 30 may include an insulating lid 32 that facilitates maintaining the desired temperature of the storage beaker 30. The storage beaker 30 may also include a double-walled pod 34 that includes one or more storage chambers 36 in which cryopreservation of biological materials, such as human or other animal eggs and/or embryos may be stored, and an opening 38 configured for receipt of the cold finger 14. The double-walled pod 343 may have a configuration and construction as shown in FIGS. 1A, 1B and 8 or as shown in FIGS. 3-7 and 9-10. It is understood that either configuration of the double-walled pod 34 is suitable for the various aspects of the present invention, and can be used interchangeably.

Referring again to FIG. 1A, the cold finger 14, which may be made from a thermally conductive material, such as cooper, may be dimensioned to fit snuggly within the opening 38 so that cooling from the cooling source 12 is transferred to the storage beaker 30 so that the desired cryogenic temperature is maintained within the storage chambers 36. It is understood that the storage chambers 36 can be maintained at the desired cryopreservation temperature as a result of their proximity to the cooling source 12 within the double-walled pod 34 of the storage beaker. In order to reduce the amount of heat gain the double-walled pod 34 may include a vacuum area 40 between the walls and additional insulation 42 at least partially surrounding the double-walled pod 34. The additional insulation 42 may be any suitable insulating material, such as open or closed cell foam or even an additional container (not shown) having another vacuum area (not shown) disposed within. The storage chambers 36 are configured to receipt and retention of one or more vitrification sticks 44, which may be collected within a goblet 46, as shown for example in FIG. 8.

Referring now to FIGS. 1B and 3-7 and 9-10, therein illustrated is an exemplary long term cryogenic storage system, generally indicated by reference numeral 50, according to an exemplary aspect of the present invention. The cryogenic storage system 50 may include the cooling source 12 coupled to a cold finger 14. The cryogenic storage system 50 may also include an insulation block 13 positioned between the storage beaker 30 and the cooling source 12. The insulation block 13 also facilitates in reducing heat gain of the cooling source 12. The cryogenic storage system 50 utilizes the same storage beaker 30 as the work station 10, so that easy transport between the work station 10 and cryogenic storage system 50, and vice versa, is possible. The features of the storage beaker 30 are the same as those discussed above with respect to the work station 10, and the same reference numerals refer to the same or similar components. Alternatively, or in addition to the insulating lid 32, the storage beaker 30 may be enclosed within a housing 33 that facilitates maintaining the desired cryogenic temperature of the storage beaker 30. The housing 33 may be made from a suitable transparent material, and may also have additional insulation (not shown) surrounding at least a portion of the housing 33. It is understood that the storage beaker 30 has been illustrated with portions of the additional insulation 42 removed so as to facilitate presentation of the storage beaker 30. While the additional insulation 42 is an optional feature of various aspects of the present invention, it is none-the-less understood that the additional insulation 42 may also at least partially surround the double-walled pod 34 in FIGS. 3-7 and 9-10.

As shown for example in FIGS. 5-7 and 9, the storage beakers 30 used in connection with the cryogenic storage system 50 may include indicia 52 disposed on the double-walled pod 34 in order to facilitate accurate identification of the biological material disposed therein. Each of the individual storage chambers 36 may also include a marking 54 positioned adjacent to the storage chamber 36 to provide a way to identify the location and/or content of biological material stored therein. In this manner, the combination of the indicia 52 and marking 54 can identify the location of the biological material for efficient and correct retrieval, and may also provide a mechanism for cataloging the content of any particular storage chamber 36. Furthermore, the storage beakers 30 may alternatively or in addition include electronic identification, tracking and/or verification components (not shown), for example RFID tags, bar codes and/or QR codes.

Figure 11:
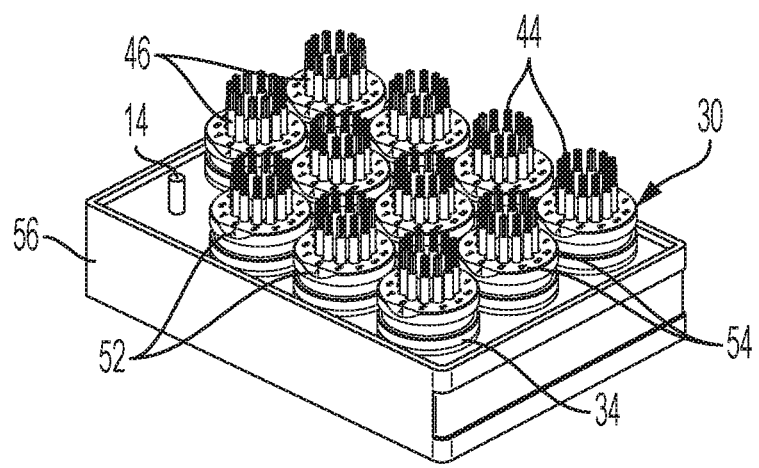
FIG. 11 is an isometric view of an exemplary cryogenic storage tray according to various aspects of the present invention.
Figure 12:
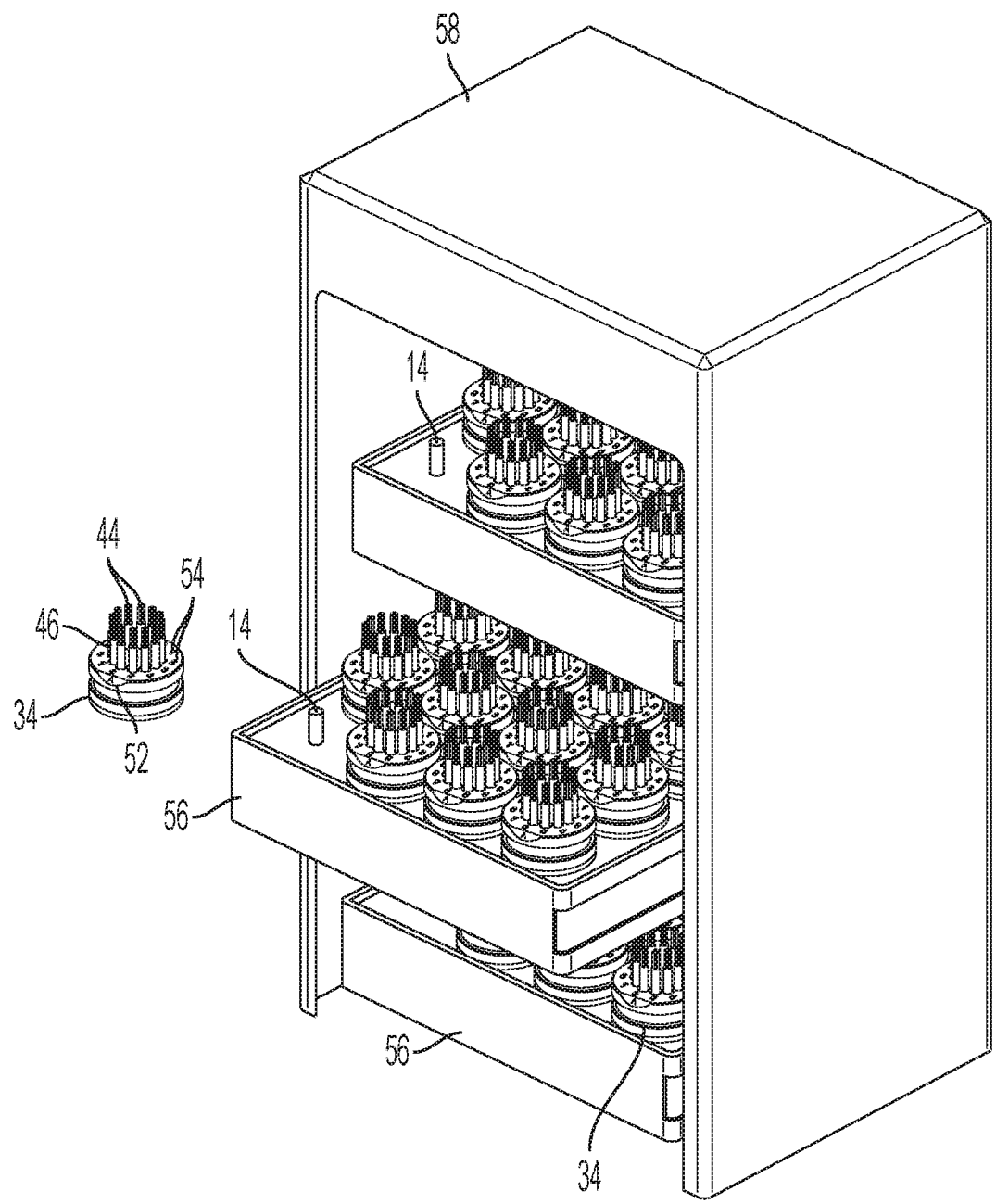
FIG. 12 is an isometric view of an exemplary cryogenic storage cabinet according to various aspects of the present invention.
Figure 13:
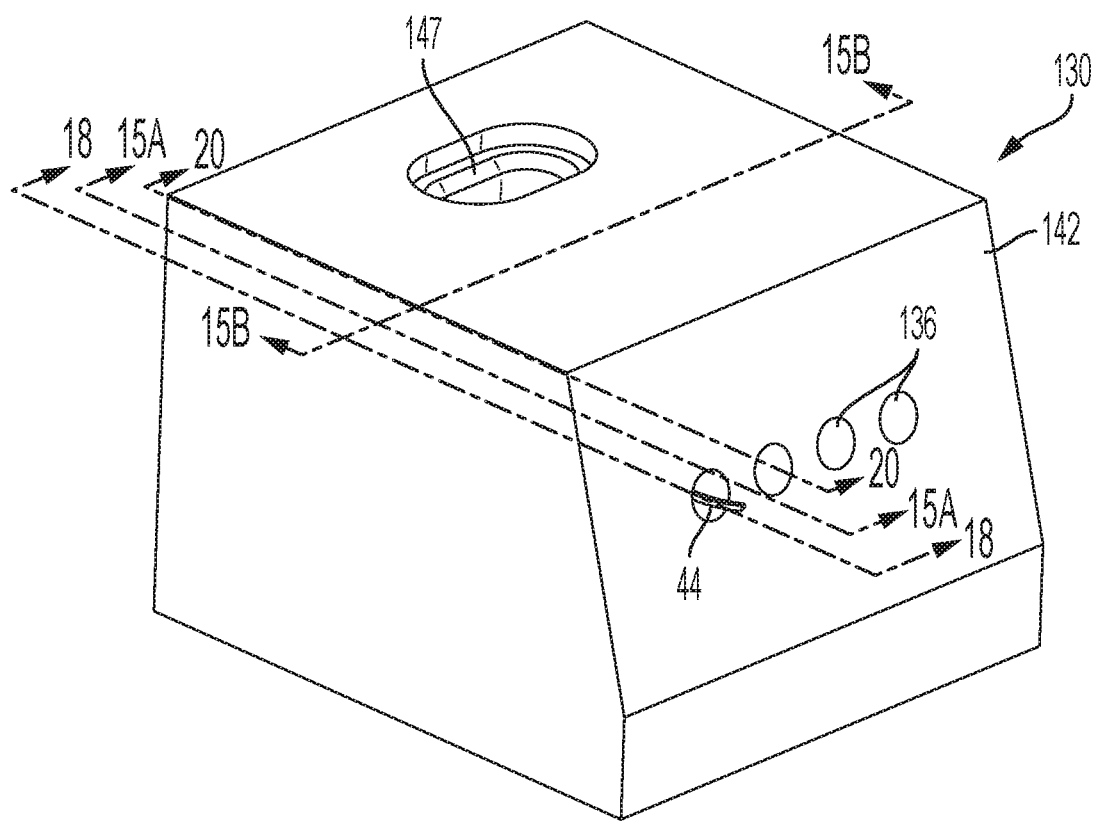
FIG. 13 is an isometric view of an exemplary cryogenic storage beaker according to another aspect of the present invention.
Figure 14:
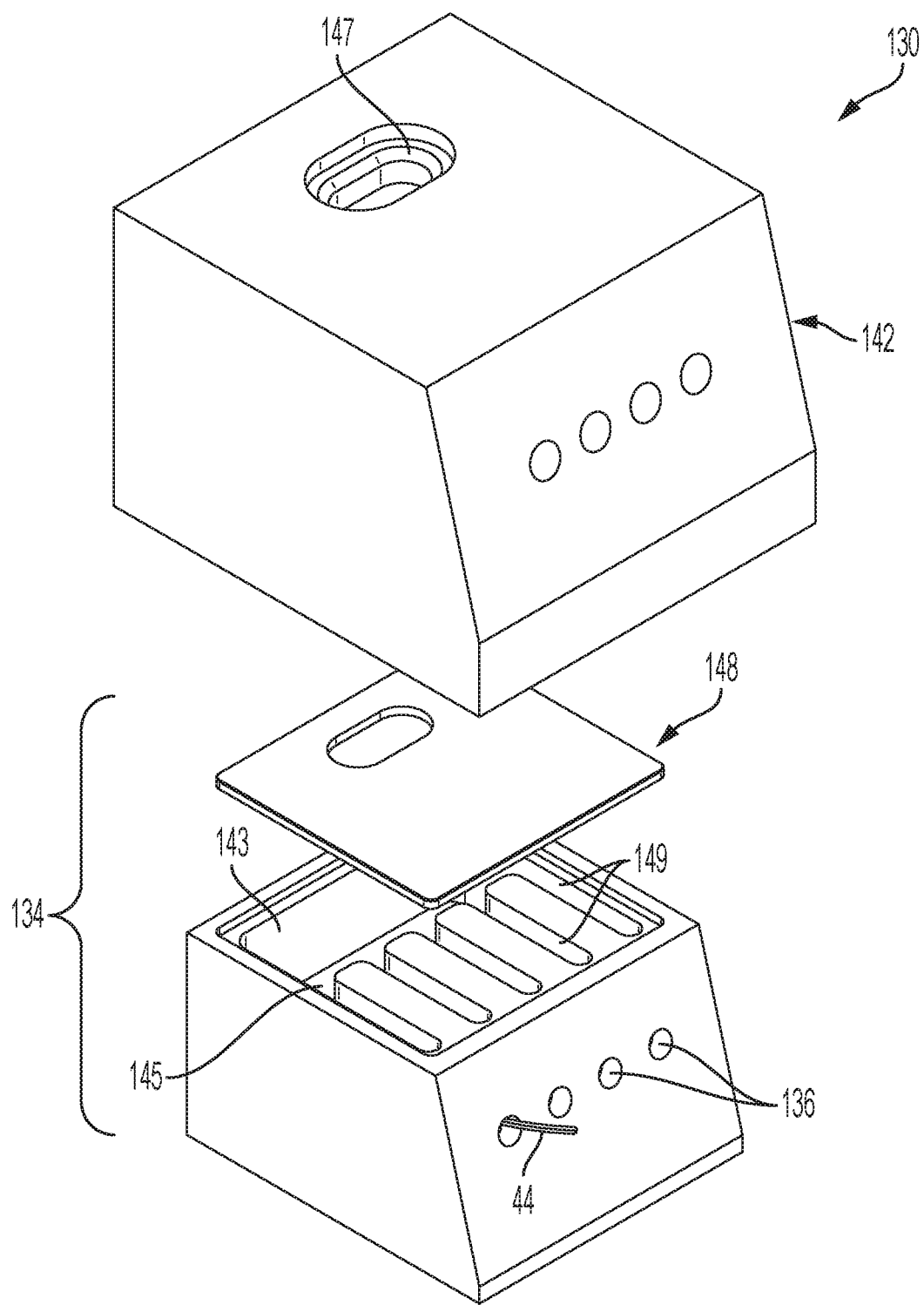
FIG. 14 is an exploded isometric view of the exemplary cryogenic storage beaker according to the other aspect of the present invention.
Figure 15:
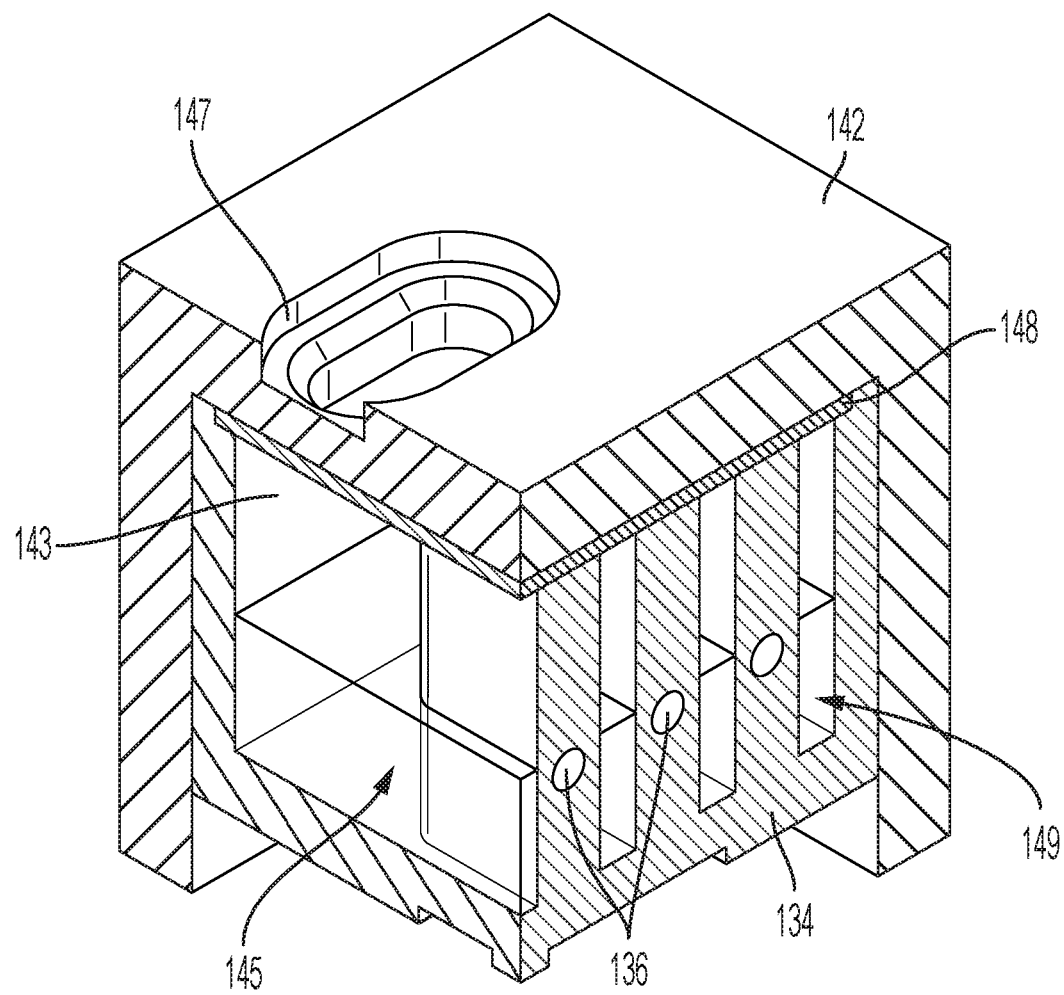
FIG. 15 is a cross-sectional view of the exemplary cryogenic storage beaker taken along lines 15A-15A and 15B-15B in FIG. 13.
Figure 16:
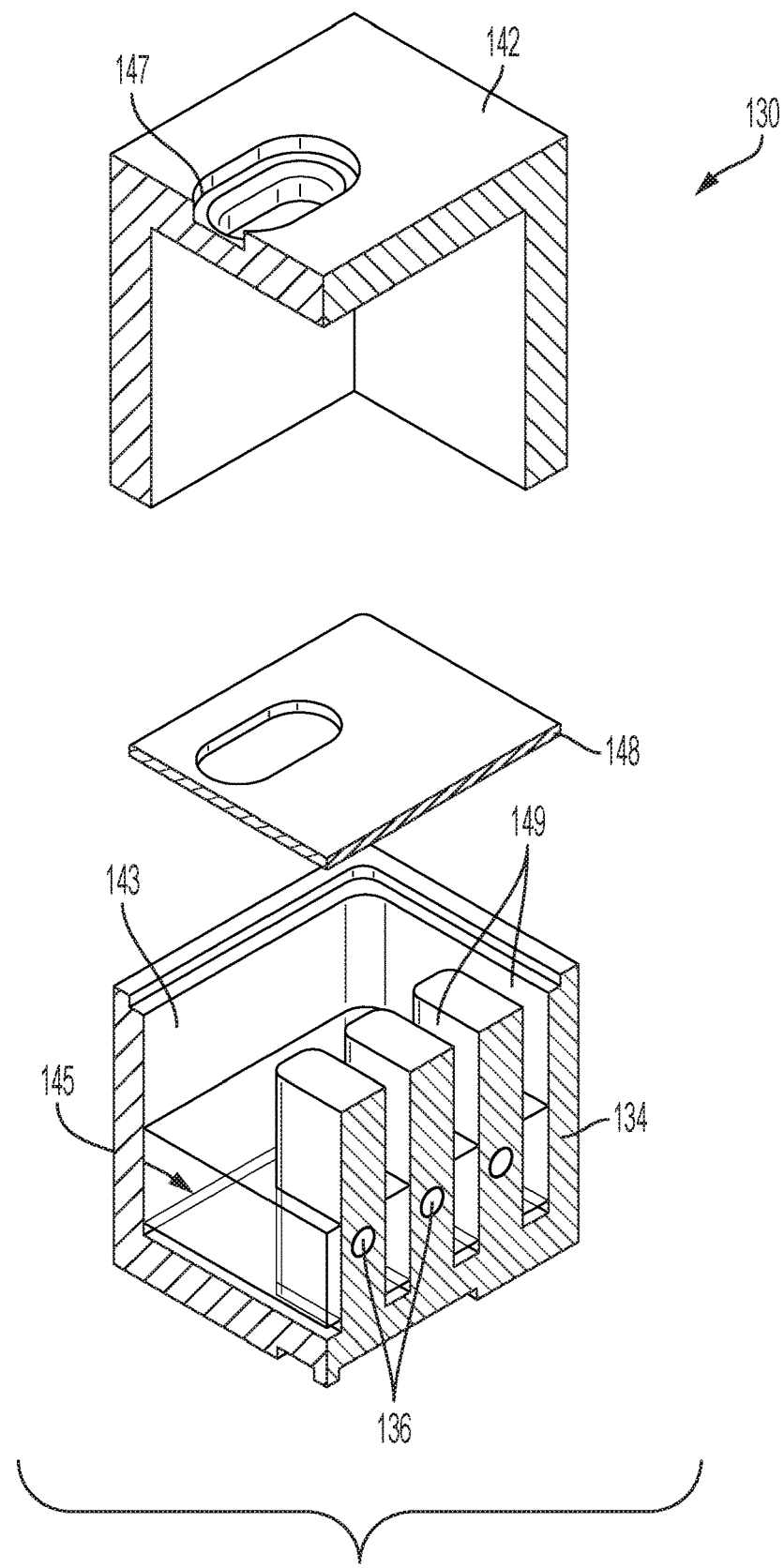
FIG. 16 is an exploded isometric view of the cross-sectional view from FIG. 15.
Figure 17:
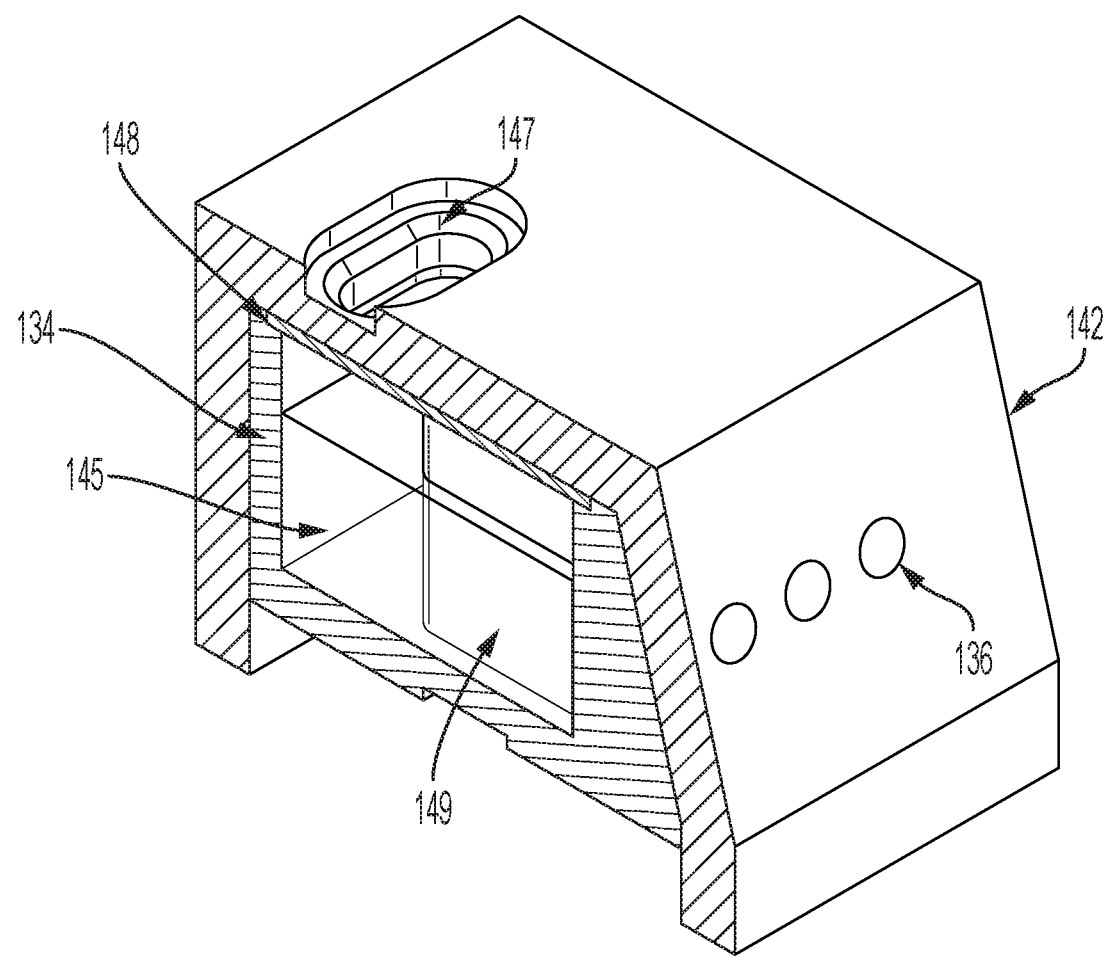
FIG. 17 is a cross-sectional view of the exemplary cryogenic storage beaker taken along line 15A-15A in FIG. 13.
Figure 18:
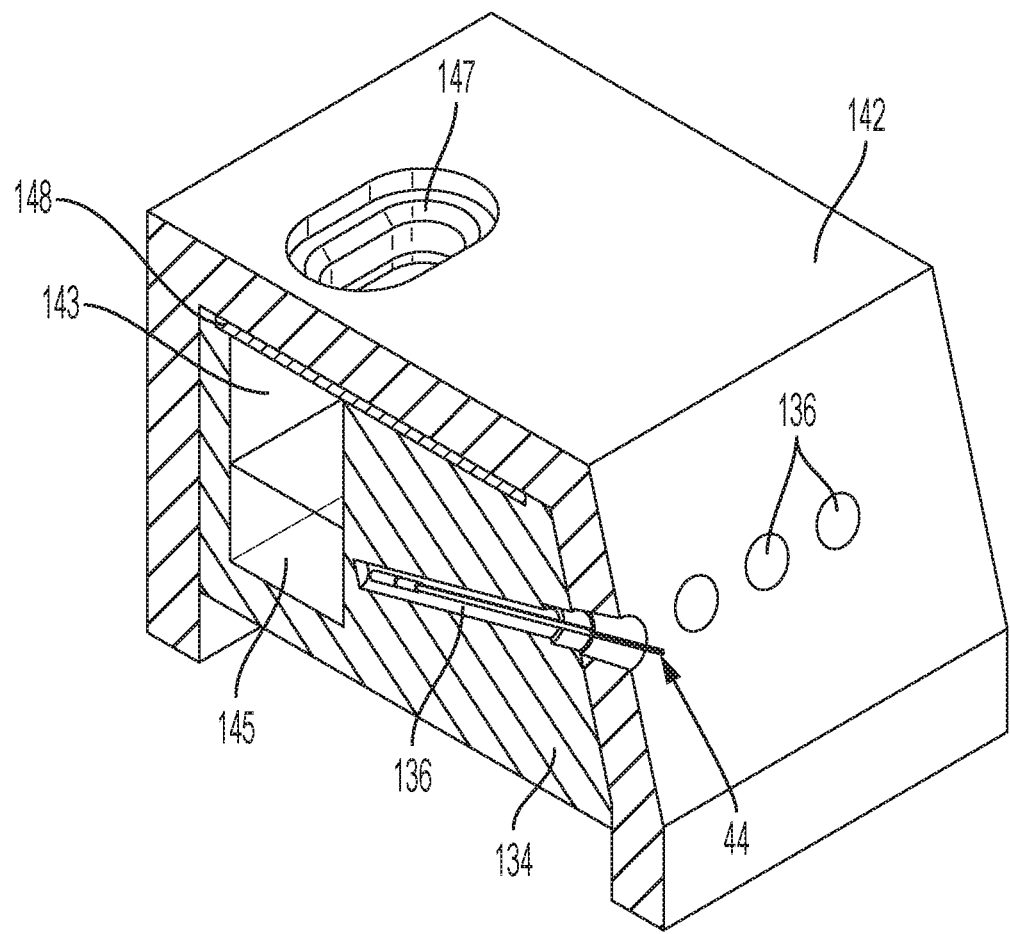
FIG. 18 is a front isometric view of the exemplary cryogenic storage beaker taken along line 18-18 in FIG. 13.
Figure 19:
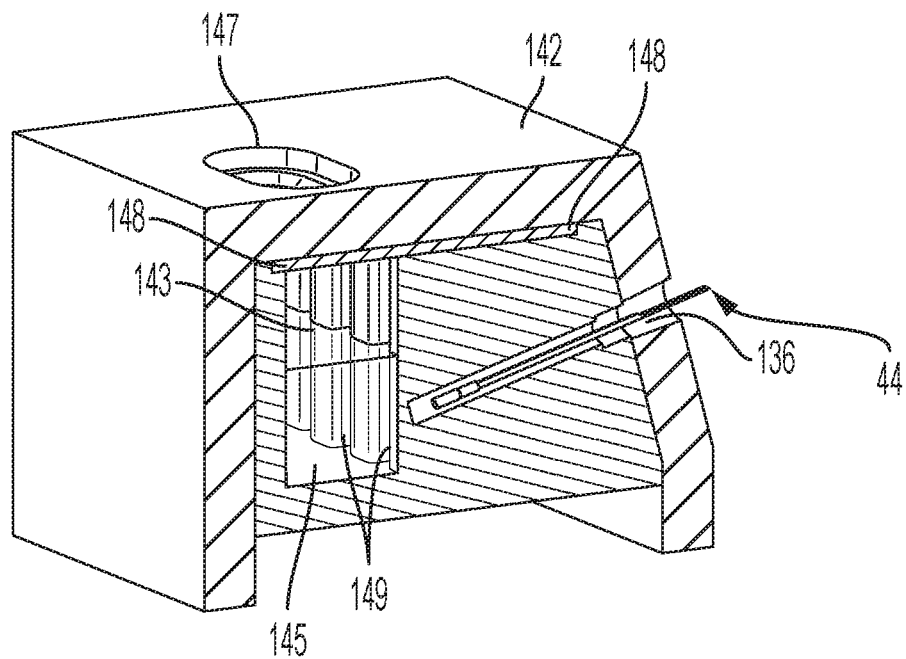
FIG. 19 is a rear isometric view of the exemplary cryogenic storage beaker taken along line 18-18 in FIG. 13.

Referring now to FIGS. 11 and 12, it is understood that the cryogenic storage system 50 according to the present invention and/or individual storage beakers 30 may be used in connection with a cryogenic storage tray 56 as shown in FIG. 11 and/or a cryogenic storage cabinet 58 as shown in FIG. 12. These trays 56 and cabinets 58 may be operatively connected to one or more cooling devices 12, and contain multiple cold fingers 14 to provide for storage of multiple storage beakers 30 within the same area.

It is also understood that the storage beakers 30 according to the present invention may provide for transport of the biological materials cryogenically preserved therein through the use of battery powered or liquid cooled cooling devices. For example, it is understood that a battery powered cooling device (not shown) may include a cold finger (not shown) on which the storage beaker 30 according to the various aspects of the present invention may be disposed so as to allow for maintenance of the desired cryogenic temperature of the storage beaker 30. Similarly, a cold finger (not shown) may be disposed within a liquid, such as liquid nitrogen, contained within a portable container for the liquid, and then the cold finger (not shown) may be coupled to the storage beaker 30 to provide for a desired cryogenic temperature of the storage beaker 30.

Referring now to FIGS. 13-24 therein illustrated is another exemplary embodiment of a storage beaker, generally indicated by reference number 130, for use in the cryopreservation of biological materials. It is understood that the storage beaker 130 may be used in substantially the same manner as storage beaker 30. For example, the storage beaker 130 may be coupled to the work station 10 so that at least one cold finger 14 of the cooling source 12 may have sufficient contact with the storage beaker 130 to reduce the temperature of the storage beaker 130 to suitable cryopreservation temperatures, and maintain the storage beaker 130 at the desired cryopreservation temperatures. Furthermore, in addition to storage of cryopreservation biological materials, the storage beaker 130 is also configured to cryogenically freeze the biological materials in a similar manner as the freezing beaker 16 discussed above, at which point the biological materials can remain within the storage beaker 130 or be moved to another suitable cryogenic storage unit. The storage beaker 130, which may ultimately be used for long term cryogenic storage of the biological materials, allows for maintenance of the cryogenic temperature of the cryopreserved biological materials. The storage beaker 30 may include a pod 134 that includes one or more storage chambers 136 in which cryopreservation of biological materials, such as human or other animal eggs and/or embryos may be stored. The pod 134 may be made from stainless steel or other suitable material. An insulating cover 142 made of suitable insulating material, such as an open or closed-cell foam or vacuum insulated, may be placed over the pod 134 in order to facilitate maintenance of the temperature of the one or more storage chambers 136 positioned within the pod 134. Furthermore, the pod 134 may include a reservoir 143 that is configured to hold a cooling agent 145, for example liquid nitrogen or dry ice, that additionally facilitates in the cryopreservation and maintenance of the desired cryogenic temperatures. For example, according to one exemplary embodiment of the present invention, the cooling source 12 may be configured to maintain the pod 134 a temperature below the boiling point of the cooling agent, for example below the boiling point of liquid nitrogen, and in this manner reduce the amount of liquid nitrogen evaporating from the reservoir. It is understood that by reducing the evaporation of the cooling agent 145 the risk of temperature fluctuations is reduced and the need to continuously monitor the amount of cooling agent 145 within the pod 134 may also be reduced. The insulating cover 142 may include an opening 147 by which additional cooling agent 145 may be added, and/or the current level of the cooling agent 145 within the reservoir 143 monitored. The opening 147 may have cap (not shown) to at least substantially seal the opening 147 of the insulating cover 142. The pod 134 may also include a lid 148 positioned over the reservoir 143. The reservoir 143 may include channels 149 extending therefrom, and the channels 149 may allow the cooling agent 145 to have a contact with a greater surface area around the storage chambers 136. The storage chambers 136 are configured to receipt and retention of one or more vitrification sticks 44.

Figure 20:
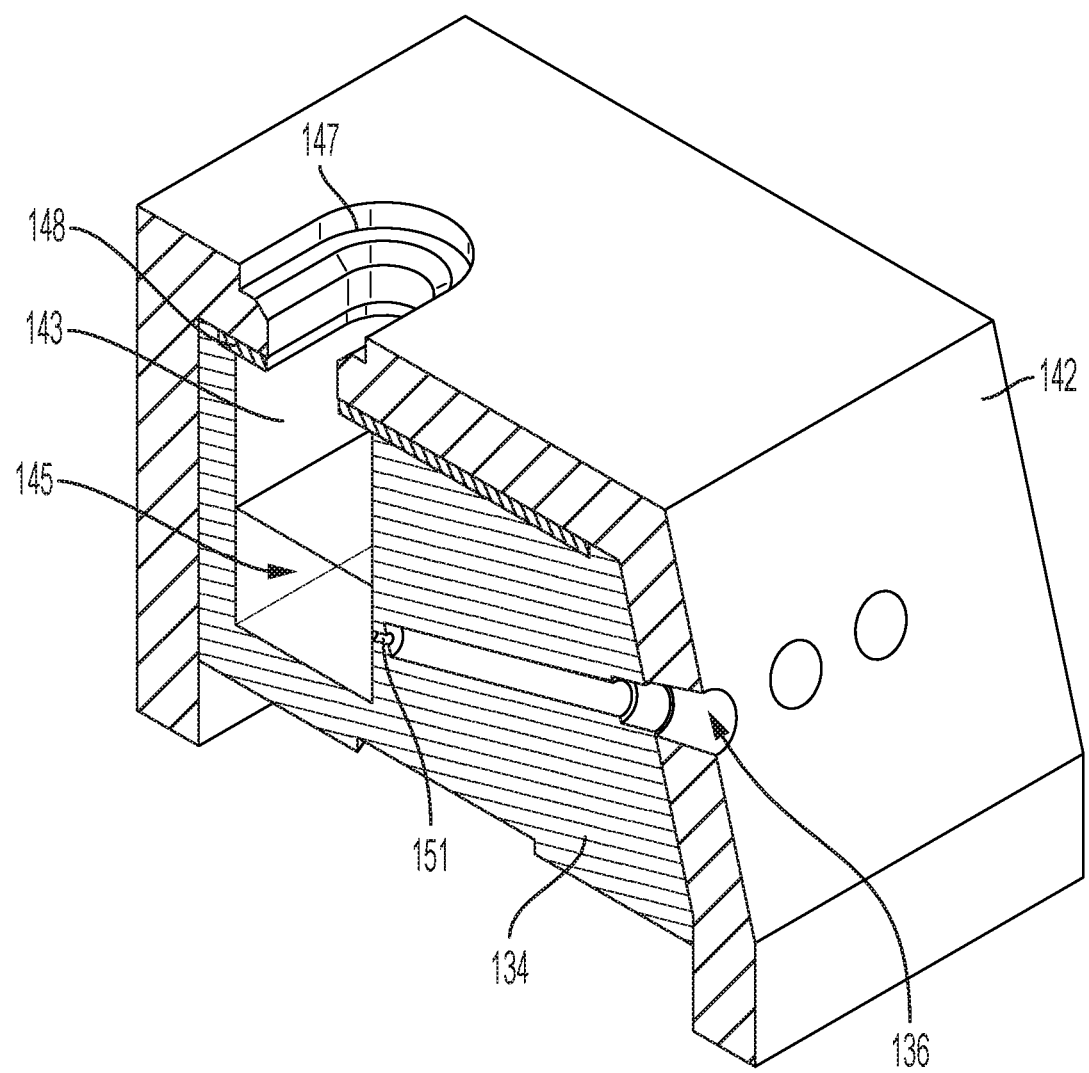
FIG. 20 is a front isometric view of the exemplary cryogenic storage beaker taken along line 20-20 in FIG. 13.
Figure 21:
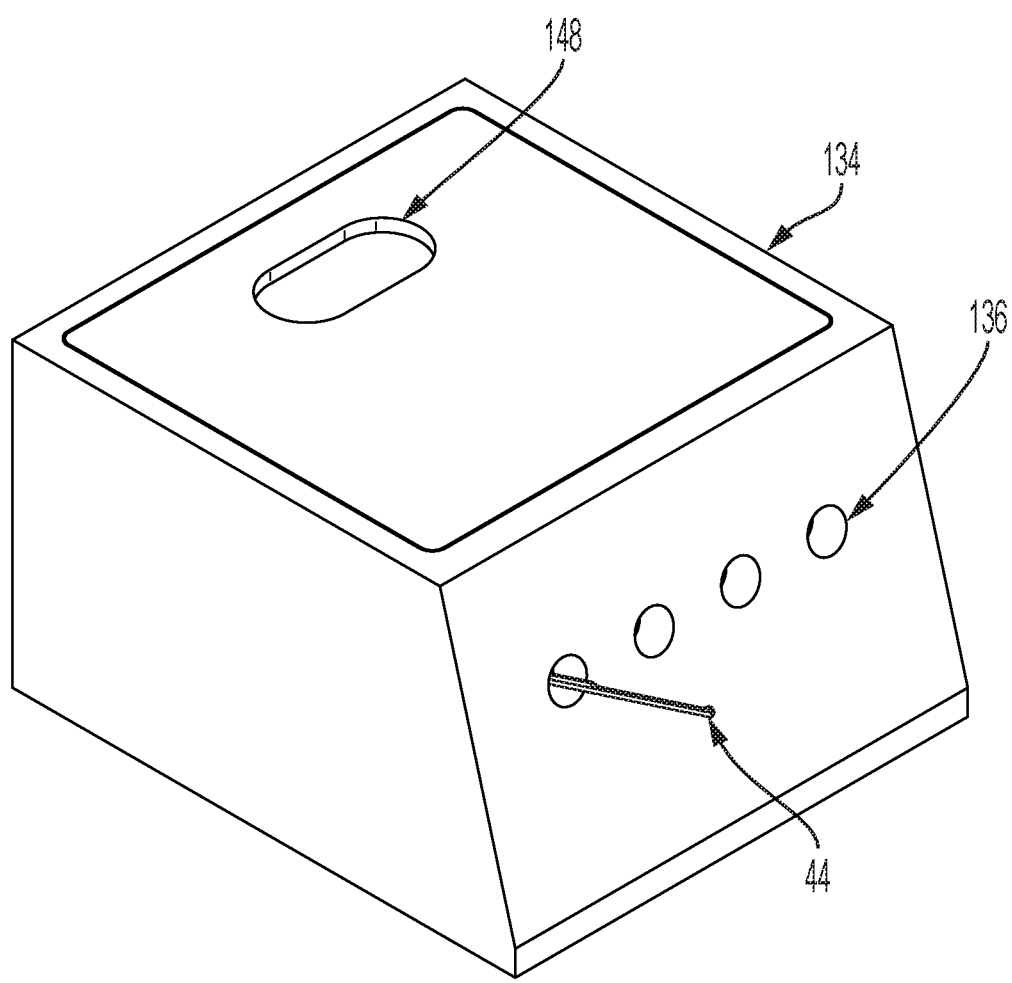
FIG. 21 is an isometric view of the exemplary cryogenic storage beaker according to the other aspect of the present invention with the insulating housing removed for purposes of clarity of illustration.
Figure 22:
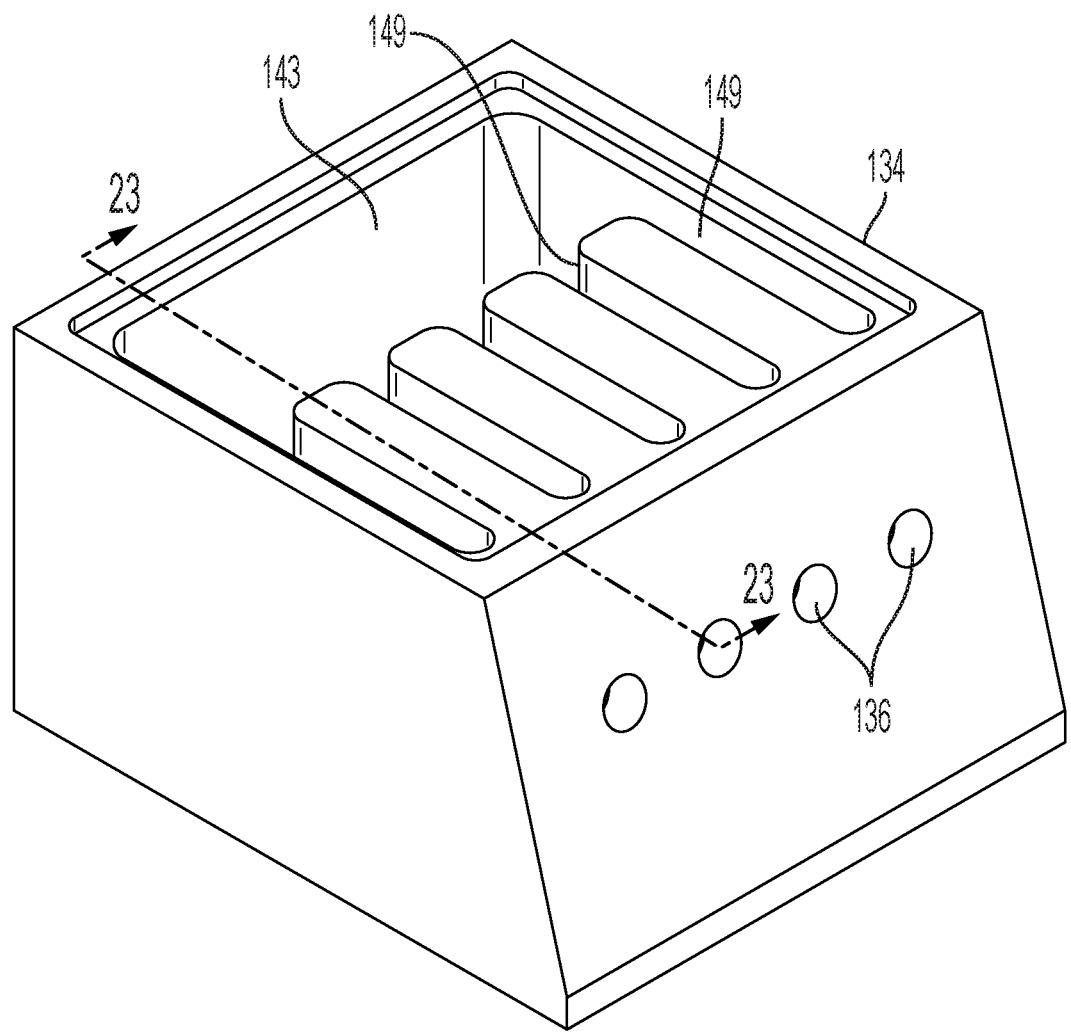
FIG. 22 is an isometric view of the exemplary cryogenic storage beaker according to the other aspect of the present invention with the insulating housing and lid removed for purposes of clarity of illustration.
Figure 23:
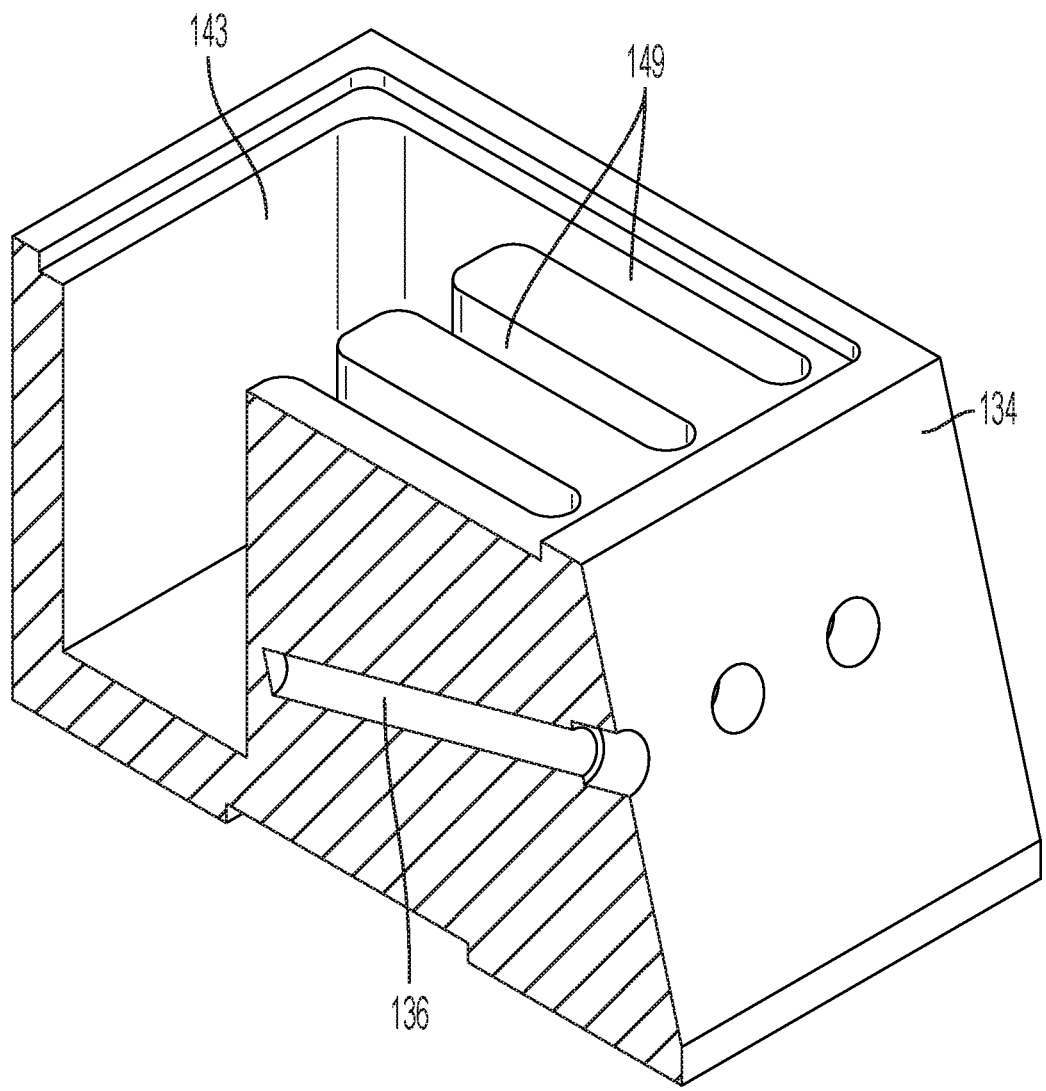
FIG. 23 is a cross-sectional view of the exemplary cryogenic storage beaker taken along line 23-23 in FIG. 22.
Figure 24:
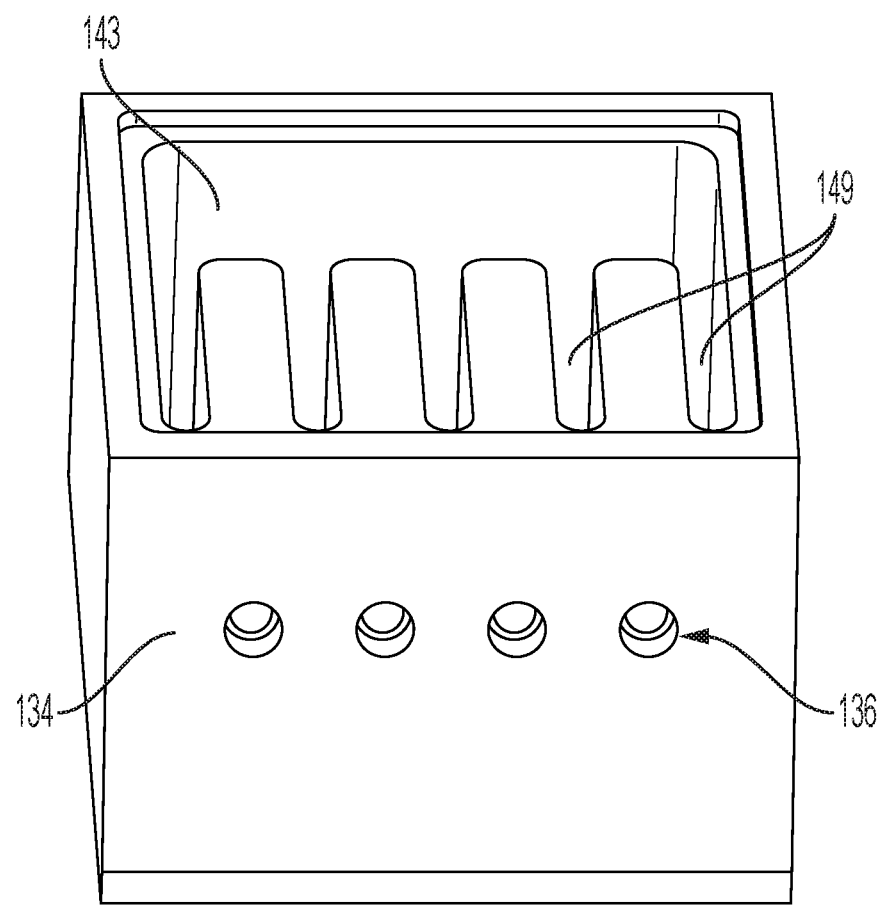
FIG. 24 is an front isometric view of the exemplary cryogenic storage beaker according to the other aspect of the present invention with the insulating housing and lid removed for purposes of clarity of illustration.

Referring now specifically to FIG. 20, one or more of the storage chambers 136 of the pod 134 may include a threaded hole 151 connecting the storage chamber 136 to the reservoir 143. The threaded hole 151 may be sealed through the use of a plug (not shown), and when the plug is removed the cooling agent 145 from the reservoir 143 may enter into at least the bottom portion of the storage chambers 136. In this manner, the cryopreservation and/or vitrification of the biological materials may be facilitated through direction contact of the cooling agent 145 with the biological materials.

The pod 134 and/or the insulating cover 142 for the pod 134 may include indicia (not shown) in order to provide identifying information for the storage beaker 130. Each of the one or more storage chambers 136 may also include a marking (not shown) positioned adjacent to the storage chamber 136, either on the pod 134 and/or insulating cover 142, in order to provide identifying information for the storage chamber 136. In this manner, the combination of the indicia and marking can provide identifying information for indicating the location and developing a catalog of biological material stored within each storage beaker 130.

It is also understood that the storage beaker 130 may be suitable for use on storage tray (not shown) and/or within a storage cabinet (not shown) configured to house multiple storage beakers 130.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A cryogenic storage system for cryopreservation of biological materials, comprising:
   a storage beaker having at least one storage chamber formed therein,
   a cooling source,
   a cold finger configured to thermally couple the storage beaker to the cooling source, and a reservoir for holding a cooling agent so that the cooling agent is thermally coupled to the at least one storage chamber, wherein the reservoir comprises a bottom surface and an opening positioned opposite the bottom surface, and wherein the at least one storage chamber is positioned at an angle relative to the bottom surface of the reservoir that is between parallel to the bottom surface of the reservoir and perpendicular to the bottom surface of the reservoir.

2. The cryogenic storage system according to claim 1, wherein the cooling source is a mechanical cooler configured to maintain the temperature of the cold finger to between 14 to 55 Kelvin.

3. The cryogenic storage system according to claim 2, wherein the mechanical cooler is configured to maintain the temperature of the cold finger at a constant temperature between 14 to 55 Kelvin.

4. The cryogenic storage system according to claim 1, wherein the cooling source is liquid nitrogen configured to reduce the temperature of the cold finger to between 14 to 77 Kelvin.

5. The cryogenic storage system according to claim 1, wherein each of the at least one storage chamber is configured for retention of at least one vitrification stick.

6. The cryogenic storage system according to claim 1, wherein the storage beaker comprises at least a first storage chamber and a second storage chamber, and wherein the storage beaker is labeled with an indicia, and the first storage chamber is labeled with a first marking and the second storage chamber is labeled with a second marking.

7. The cryogenic storage system according to claim 1, wherein the storage beaker comprises at least one electronic tracking component.

8. The cryogenic storage system according to claim 1, wherein the reservoir is connected to the at least one storage chamber through a threaded hole.

9. The cryogenic storage system according to claim 1, wherein the cooling agent is liquid nitrogen.

10. The cryogenic storage system according to claim 1, wherein the cryogenic storage system is portable.

11. The cryogenic storage system according to claim 1, wherein the storage beaker further comprises an insulating lid.

12. The cryogenic storage system according to claim 1, wherein the storage beaker is at least partially enclosed within a housing.

* * * * *